J. A. SCHOFIELD.
LOCK NUT.
APPLICATION FILED MAY 29, 1919.
1,316,112.  Patented Sept. 16, 1919.
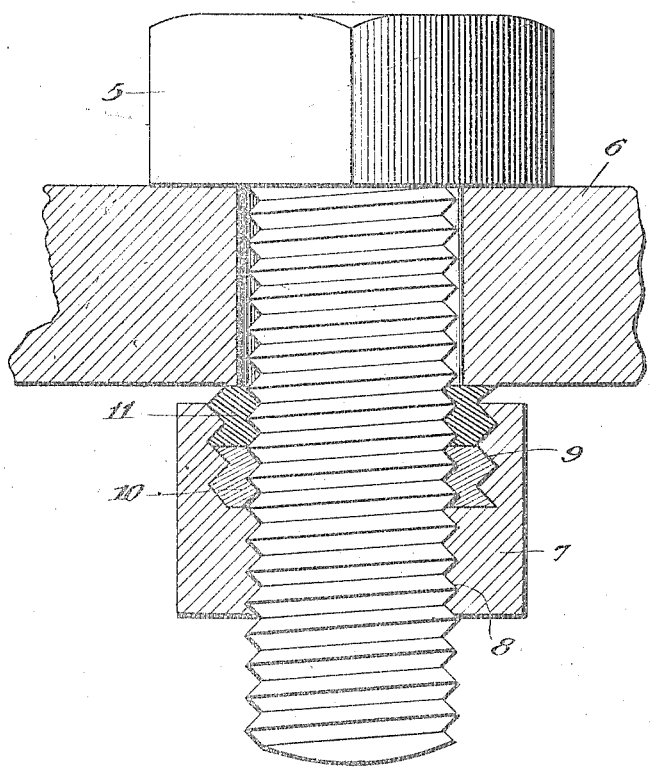
WITNESSES
E. A. Buchanan
INVENTOR
J. A. Schofield.
BY
ATTORNEYS

UNITED STATES PATENT OFFICE.

JOHN A. SCHOFIELD, OF THE UNITED STATES NAVY.

LOCK-NUT.

1,316,112.     Specification of Letters Patent.     Patented Sept. 16, 1919.

Application filed May 29, 1919. Serial No. 300,529.

*To all whom it may concern:*

Be it known that I, JOHN A. SCHOFIELD, an officer in the United States Navy, reserve force, and a resident of Washington, in the District of Columbia, have invented certain new and useful Improvements in Lock-Nuts, of which the following is a specification.

This invention is an improved lock nut, and one of the principal objects thereof is to utilize a soft ring of ductile material in connection with a hard compression ring, both contained in the nut, for securing a binding action between the threads of the compression ring of the nut and the bolt, and in addition thereto, a binding action of the soft ring about the threads of the bolt, thereby retaining the nut in position on the bolt in such manner as to prevent its backing off.

Another object of the invention is to use in connection with the nut, a hard ring threaded into the nut, which ring is in turn interiorly threaded to conform to the pitch of the threads of the bolt, the threads between the nut and the ring being of a greater pitch than those of the bolt, whereby when the lock nut is in position, a compression between the threads of the nut and the bolt and the ring and the bolt will take place, this compression exerting itself in opposite directions longitudinally of the axis of the bolt, thereby binding the nut in place and preventing its accidental removal.

A further object of the invention is to provide an improved lock nut which will be exceedingly simple, durable and efficient in operation and inexpensive to manufacture.

With these and other objects in view which will become apparent as the description proceeds, the invention resides in the construction, combination and arrangement of parts hereinafter more fully described and claimed, and illustrated in the accompanying drawing, in which—

The figure represents a view showing a nut in operation, the same being shown in section.

Referring more particularly to the drawing, a bolt is indicated at 5, and the work through which the bolt extends is indicated at 6. The lock nut 7 is bored at its inner end, the diameter of the bore being greater than that of the usual threaded opening 8 the opening 8 are the same pitch as those extending through the nut. The threads of the bolt 5, and the bore is interiorly threaded at 9, the pitch of the threads being greater than the pitch of the bolt threads.

In the bottom of the bore portion of the nut, a lead or other soft metal ring 10 is cast cold under pressure. This ring is then threaded to form a continuation of the threads 8 of the nut. Into the bore above the ring 10 is turned a hard compression ring 11 made of iron or steel or other suitable material which is threaded on its inside to conform to the pitch of the threads of the bolt, and is threaded on its outside to conform to the pitch of the threads 9 of the nut. It will thus be understood that the nut 7 and ring 10, and ring 11 are internally threaded the threads being of a pitch to conform to the pitch of the threads of the bolt 5.

In operation, the nut with the soft and hard rings assembled therein is screwed down on the bolt. As soon as the hard ring 11 engages the work it will cease to rotate relatively to the bolt. Under the increased force of the wrench, the nut will be screwed down farther. In moving farther along the bolt, it will travel faster along the threads of the ring 11 which is now stationary than down the threads of the bolt. This will cause a compression of the bolt threads between the nut 7 and the hard ring 11, the compression exerting itself in opposite directions, that is, in a direction toward the head of the bolt, as shown in the figure, between the nut 7 and the bolt, and away from the head of the bolt between the hard ring 11 and the bolt. Thus the threads of the bolt will be bound between the nut and the hard ring. In addition to the locking action thus caused, the soft ring 10, by reason of the movement of the nut relative to the hard ring 11, will be compressed and will flow out laterally to bind tightly and grip the threads of the bolt, and thereby form an additional lock between the bolt and the nut. This compression of the soft ring, will also tend to bind the ring 11 against movement with respect to the nut in addition to the binding action already secured by reason of the compression on the threads of the bolt between the ring 11 and the nut.

In disconnecting the nut, a sufficient force must first be used to relieve the pressure on the bolt by backing the nut slightly. If the ring 11 should then stick, the backing motion would be continued to bring the threads of the bolt under tension. At this point the relative binding action of the nut and the hard ring would cause the ring to turn relatively to the bolt. Then a slight reverse turn of the nut will relieve the tension, and a continuation of the backing motion, the tension having been relieved, and the hard ring having been started on the threads of the bolt, will cause the withdrawal of the nut from the bolt, the ring turning with the nut. The soft ring will back off with the nut.

Although I have described the preferred embodiment of my invention, I may desire to make such changes in the construction, combination and arrangement of parts thereof as do not depart from the spirit of the invention or the scope of the appended claims.

I claim:—

1. A lock nut having an opening merging at one end of the nut into a bore, the diameter of which is greater than the diameter of the opening, the bore and the opening being internally threaded, the threads of the bore being of a greater pitch than those of the opening, a ring of soft material threaded into the bore, a ring of hard material threaded into the bore, said soft and hard rings being internally threaded to conform to the pitch of the threads in the opening in the nut, substantially as described.

2. A lock nut having a soft ring and a hard ring arranged in a recess in the nut, said soft and hard rings being interiorly threaded to conform to the pitch of the threads in the nut, the recess in which the soft and hard rings are arranged being internally threaded, said soft and hard rings being exteriorly threaded to conform to the threads of the recess, the threads of the recess being of a greater pitch than the threads of the nut.

3. A lock nut having an interiorly threaded opening, said nut being bored at one end, the bore being interiorly threaded, the threads of the bore and of the opening in the nut, being of different pitch, and a ring threaded into the bore and provided with a threaded opening, the threads of the opening of the ring conforming in pitch to the threads of the opening in the nut.

4. A lock nut having a threaded opening and having a threaded bore of greater diameter than the opening, the threads of the opening and bore of the nut being of different pitch, a soft ring arranged in the bore, and a hard ring threaded into the bore above the soft ring, said soft and hard rings being interiorly threaded at a pitch to conform to the pitch of the threads of the opening in the nut.

5. A lock nut having a threaded opening and having a threaded bore of greater diameter than the opening, and a pair of rings, one of relatively hard and the other of relatively soft material threaded into the bore, both rings being interiorly threaded to form a continuation of the threaded opening in the nut.

JOHN A. SCHOFIELD.